US011901689B2

(12) United States Patent
Fontaine et al.

(10) Patent No.: US 11,901,689 B2
(45) Date of Patent: Feb. 13, 2024

(54) RECEPTACLE DEVICE OF A TERMINAL BLOCK FOR ALTERNATIVELY RECEIVING A FIRST ACCESSORY AND A SECOND ACCESSORY

(71) Applicant: Tyco Electronics France SAS, Pontoise (FR)

(72) Inventors: Philippe Fontaine, Pontoise (FR); Francois Fayard, Pontoise (FR)

(73) Assignee: Tyco Electronics France SAS, Pontoise (FR)

( * ) Notice: Subject to any disclaimer, the term of this patent is extended or adjusted under 35 U.S.C. 154(b) by 0 days.

(21) Appl. No.: 17/842,013

(22) Filed: Jun. 16, 2022

(65) Prior Publication Data

US 2022/0311159 A1 Sep. 29, 2022

Related U.S. Application Data

(63) Continuation of application No. PCT/EP2020/086007, filed on Dec. 14, 2020.

(51) Int. Cl.
*H01R 9/26* (2006.01)
*H01R 13/46* (2006.01)

(52) U.S. Cl.
CPC ......... *H01R 9/2683* (2013.01); *H01R 13/465* (2013.01)

(58) Field of Classification Search
CPC .. H01R 9/2683; H01R 13/465; H01R 9/2608; H01R 9/2691
See application file for complete search history.

(56) References Cited

U.S. PATENT DOCUMENTS

2011/0183542 A1 7/2011 Pizzi

FOREIGN PATENT DOCUMENTS

EP 2882042 A1 6/2015
EP 3159975 A1 4/2017
FR 2362505 A1 3/1978
FR 2849291 A1 6/2004
KR 20160111139 A * 9/2016 ........... H01R 9/2475
(Continued)

OTHER PUBLICATIONS

Extended European Search Report, Application No. 1930669.3-1201, dated May 29, 2020, 8 pages.
(Continued)

*Primary Examiner* — Oscar C Jimenez
*Assistant Examiner* — Paul D Baillargeon
(74) *Attorney, Agent, or Firm* — Barley Snyder

(57) ABSTRACT

A receptacle device includes a first cooperating assembly configured to receive a first accessory having a plurality of first sized cooperating elements and a second cooperating assembly configured to receive a second accessory having a plurality of second sized cooperating elements. The first cooperating assembly has a pair of protrusions of a first type that are symmetrical with regard to a first central plane and that extend toward each other transversally to the first central plane. The second cooperating assembly has a pair of protrusions of a second type that are symmetrical with regard to a second central plane and that extend opposite to each other transversally to the second central plane. The first central plane is parallel to the second central plane.

20 Claims, 3 Drawing Sheets

(56) References Cited

FOREIGN PATENT DOCUMENTS

| | | | | |
|---|---|---|---|---|
| WO | 2004068644 A1 | | 8/2004 | |
| WO | 2018215186 A1 | | 11/2018 | |
| WO | WO-2021104928 A1 | * | 6/2021 | ............. H01R 43/00 |

OTHER PUBLICATIONS

PCT International Search Report and Written Opinion, Application No. PCT/EP2020/086007, dated Feb. 11, 2021, 13 pages.

* cited by examiner

RECEPTACLE DEVICE OF A TERMINAL BLOCK FOR ALTERNATIVELY RECEIVING A FIRST ACCESSORY AND A SECOND ACCESSORY

CROSS-REFERENCE TO RELATED APPLICATIONS

This application is a continuation of PCT International Application No. PCT/EP2020/086007, filed on Dec. 14, 2020, which claims priority under 35 U.S.C. § 119 to European Patent Application No. 19306669.3, filed on Dec. 17, 2019.

FIELD OF THE INVENTION

The present invention concerns a receptacle device of a terminal block configured for alternatively receiving in a mounted position a first accessory with first sized cooperating elements and a second accessory with second sized cooperating elements.

BACKGROUND

It is known to have a terminal block configured for receiving an accessory that can be a marker or a marker holder. It is also known to have a receptacle device built in the terminal block to secure the accessory in a removable way.

This provision allows easily mounting and dismounting of the accessory. However, the receptacle device should have a cooperating assembly that is compatible with all kinds of complementary cooperating elements of the accessories. This feature could imply constraints on the geometry or on the size of the accessory. In addition, it could be impossible to accommodate existing accessories with cooperating elements that are not compatible with the cooperative assembly of the receptacle device.

SUMMARY

A receptacle device includes a first cooperating assembly configured to receive a first accessory having a plurality of first sized cooperating elements and a second cooperating assembly configured to receive a second accessory having a plurality of second sized cooperating elements. The first cooperating assembly has a pair of protrusions of a first type that are symmetrical with regard to a first central plane and that extend toward each other transversally to the first central plane. The second cooperating assembly has a pair of protrusions of a second type that are symmetrical with regard to a second central plane and that extend opposite to each other transversally to the second central plane. The first central plane is parallel to the second central plane.

BRIEF DESCRIPTION OF THE DRAWINGS

The invention will now be described by way of example with reference to the accompanying Figures, of which:

FIG. 7 is a perspective view of a terminal block with the receptacle device built in;

DETAILED DESCRIPTION OF THE EMBODIMENT(S)

Figure 1:
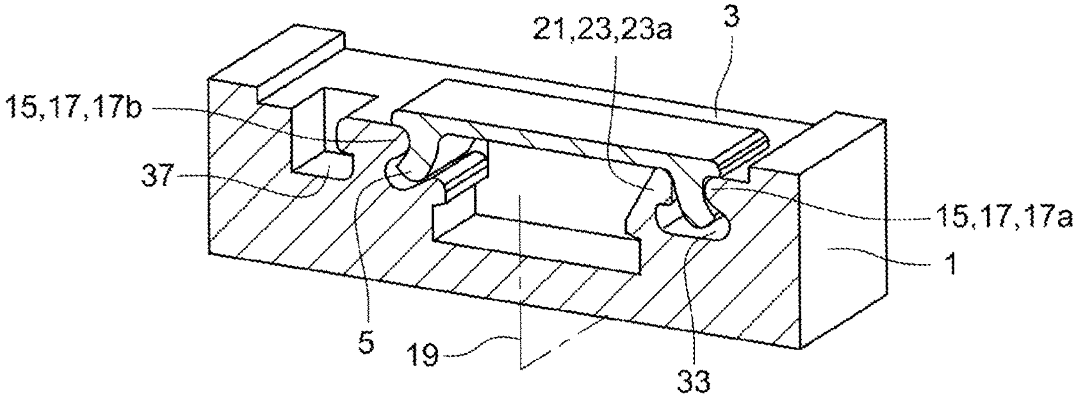
FIG. 1 is a sectional perspective view of a receptacle device according to an embodiment cooperating with a first accessory.

In the following detailed description, the same elements or the elements that are fulfilling identical functions may retain the same references to simplify the understanding of the invention.

As illustrated in FIGS. 1 to 4, a receptacle device 1 is configured for alternatively receiving in a mounted position a first accessory 3 with first sized cooperating elements 5, a second accessory 7 with second sized cooperating elements 9, and a third accessory 11 having third sized cooperating elements 13.

The receptacle device 1 has a first cooperating assembly 15 configured to receive the first accessory 3, the first cooperating assembly 15 being provided with two protrusions of a first type 17 that are symmetrical with regard to a first central plane 19 and extend towards each other transversally to the first central plane 19, as shown in FIG. 1.

Figure 2:
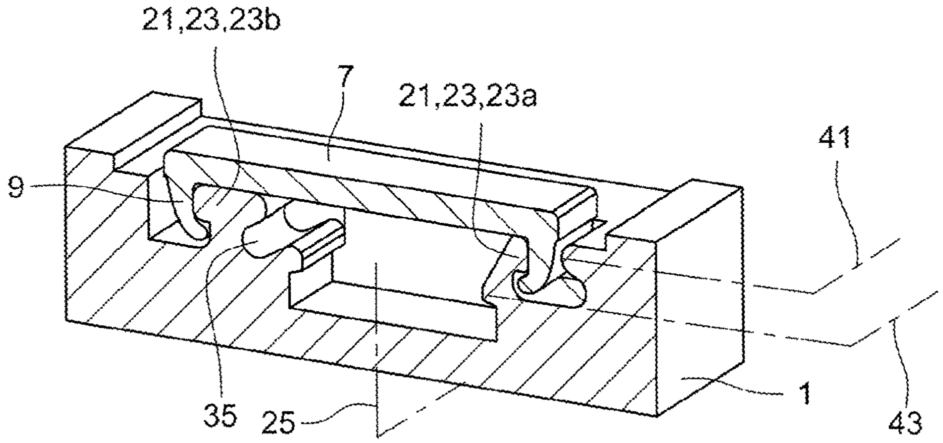
FIG. 2 is a sectional perspective view of the receptacle device cooperating with a second accessory.

The receptacle device 1 has a second cooperating assembly 21, shown in FIGS. 1 and 2, configured to receive the second accessory 7. The second cooperating assembly 21 has two protrusions of a second type 23 that are symmetrical with regard to a second central plane 25 and that extend opposite to each other transversally to the second central plane 25.

Figure 3:
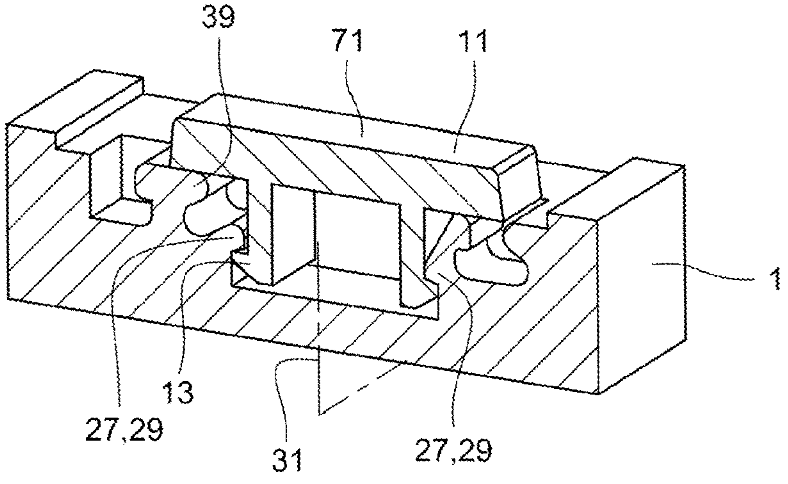
FIG. 3 is a sectional perspective view of the receptacle device cooperating with a third accessory.

The receptacle device 1 has a third cooperating assembly 27, shown in FIG. 3, configured to receive the third accessory 11 in a mounted position. The third cooperating assembly 27 has two protrusions of a third type 29 that are symmetrical with regard to a third central plane 31 and that extend towards each other transversally to the third central plane 31. The first central plane 19 is parallel to the second central plane 25 and to the third central plane 31.

The two protrusions of the first type 17 include a first protrusion of the first type **17*a* and the two protrusions of the second type 23 include a first protrusion of the second type 23*a*. The receptacle device 1 having a common recess 33, shown in FIG. 1, wherein the first protrusion of the first type 17*a* and the first protrusion of the second type 23*a* extend towards each other transversally to the first central plane 19. The first protrusion of the first type 17*a* and the first protrusion of the second type 23*a* face each other transversally to the first central plane 19**.

The two protrusions of the first type 17 include a second protrusion of the first type **17*b* and the two protrusions of the second type 23 include a second protrusion of the second type 23*b*. The receptacle device 1 has a recess of the first type 35, shown in FIG. 2, where the second protrusion of the first type 17*b* is formed and has a recess of the second type 37, shown in FIG. 1, where the second protrusion of the second type 23*b*** is formed.

As shown in FIG. 3, the receptacle device 1 has a separating wall 39 extending parallel to the first central plane 19 on which the second protrusion of the first type 17*b* and the second protrusion of the second type 23*b* are formed. The separating wall 39 defines the recess of the first type 35 and the recess of the second type 37.

The two protrusions of the first type 17 and the two protrusions of the second type 23 extend according to a longitudinal plane 41 that is transverse to the first central plane 19.

The protrusions of the third type 29 extend in an offset plane 43 parallel to the longitudinal plane 41. The receptacle device 1 has a central recess 45, shown in FIG. 4, wherein the protrusions of the third type 29 are included facing each other. The first accessory 3 and the second accessory 7 can be installed at a same level so that they have a similar appearance on the receptacle device 1 although their cooperating elements 5, 9 are different.

Figure 4:
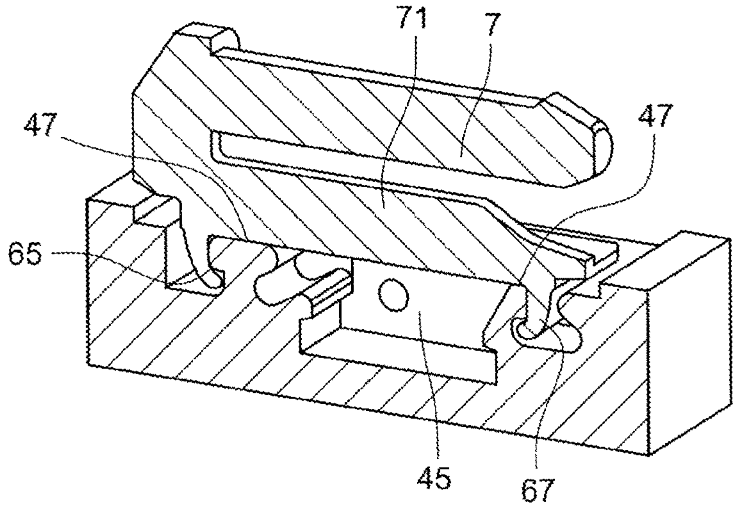
FIG. 4 is a sectional perspective view of the receptacle device cooperating with a variant of the second accessory.

The first cooperating assembly 15, the second cooperating assembly 21 and/or the third cooperating assembly 27 have at least one supporting surface 47, shown in FIG. 4, extending transverse to the first central plane 19 and configured to be in contact with the first accessory 3, the second accessory 7 or the third accessory 11 in mounted position.

Figure 5:
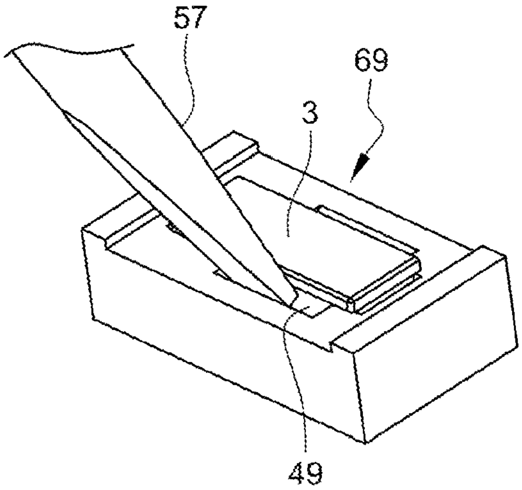
FIG. 5 is a sectional perspective view of the receptacle device cooperating with another variant of the second accessory.
Figure 6:
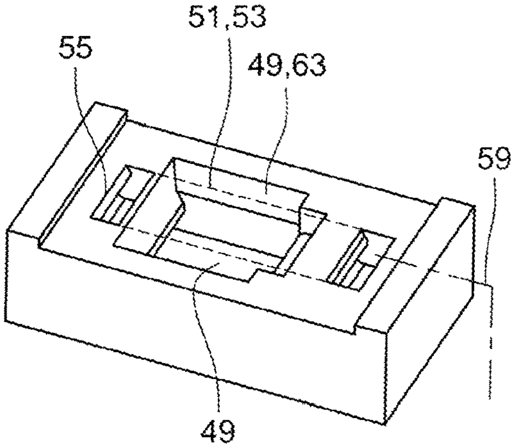
FIG. 6 is a perspective view of the receptacle device without an accessory.

As illustrated in FIGS. 5 and 6, the receptacle device 1 further has an access recess 49 extending transversally to and deeper than the supporting surface 47, the access recess 49 being configured to at least partially face the first accessory 3, the second accessory 7 or the third accessory 11 in mounted position transversally to the supporting surface 47. In other words, the access recess 49 is configured to engender a free space under the first accessory 3, under the second accessory 7 or under the third accessory 11 in mounted position. The access recess 49 can be used to dismantle any accessory 3, 7 and 11.

The protrusions of the first type 17 and the protrusions of the second type 23 extend in an area 51 shown in FIG. 6 transversally to the first central plane 19, the area 51 being defined by a longitudinal dimension 53 and a lateral dimension 55. The access recess 49 extends at least partly outside the lateral dimension 55.

The access recess 49 accesses the first accessory 3, the second accessory 7 or the third accessory 11 from the side for easy dismounting, for example with a tool such as a screwdriver 57. The lateral dimension 55 is transverse and may be parallel to the longitudinal dimension 53. The area 51, in an embodiment, is a rectangle.

The receptacle device 1 comprises two symmetrical access recess 49 with respect to a transverse plane 59 extending transversally to the first central plane 19, as shown in FIG. 6. There is access to the first accessory 3 or the second accessory 7 from both sides. The transverse plane 59 extends transversally to the longitudinal plane 41.

Figure 7:
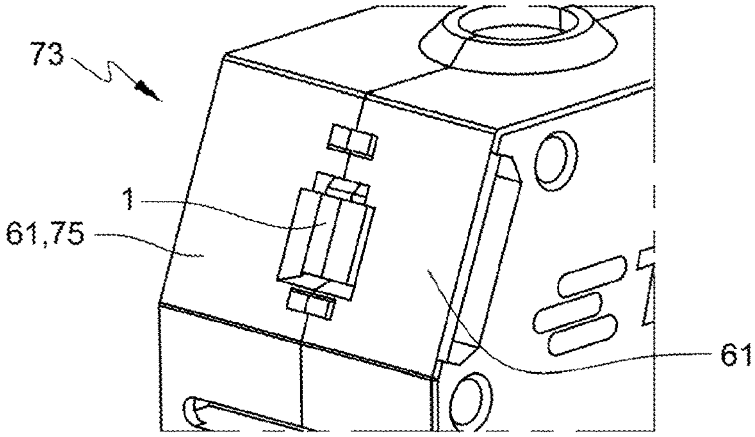

As illustrated in FIG. 7, the receptacle device 1 comprises two symmetrical parts 61 with respect to the transverse plane 59. The two symmetrical parts 61 are configured to be attached to each other. This allows an easy fabrication of the receptacle device 1 as each part 61 presents a complementary extruded form.

Alternatively, the receptacle device 1 can comprise a unique part, said unique part being molded. The through holes enables forming the receptacle device 1 by molding.

The protrusions of the first type 17, the protrusions of the second type 23 and the protrusions of the third type 29 each present a profile extending according to the lateral dimension 55.

The central recess 45 is located between the common recess 33 on one side and the recess of the first type 35 and the recess of the second type 37 on the other side. Each access recess 49 opens onto the central recess 45 so as to engender a unique recess. Each access recess 49 is defined by a corresponding inclined wall 63, shown in FIG. 6, oriented toward the central recess 45 and inclined with respect to the longitudinal plane 41.

Each protrusion 17, 23, 29 engenders a corresponding retaining wall 65 configured to cooperate with a corresponding leg 67 of the complementary accessory 3, 7, 11. The leg 67 extending in an opposite direction with regard to the corresponding protrusion 17, 23, 29 transversally to the first central plane 19.

The complementary accessory 3, 7, 11 can be a first accessory 3, a second accessory 7 or a third accessory 11.

An accessory cooperation system 69 comprises a receptacle device 1 as detailed before and a first accessory 3, second accessory 7 or a third accessory 11. The first accessory 3, the second accessory 7 and/or the third accessory 11 comprise a main body 71 linking their two legs 67, as shown in FIG. 4.

The first accessory 3, the second accessory 7 and/or the third accessory 11 are markers each with an external label surface transverse to the first central plane as in FIGS. 1 to 3 or a marker holder designed to cooperate with a separated marking element as in FIG. 4. Each marker can present an external label surface wherein a reference is written manually, printed or stuck.

As illustrated in FIG. 7, a terminal block 73 comprises a receptacle device 1 as disclosed above, wherein the receptacle device 1 is built in a face 75 of the terminal block so as not to exceed said face 75 transversally to said face 75. The terminal block 73 comprises the two symmetrical parts 61 mounted together according to the transverse plane 59. Said two parts 61 are symmetrical with respect to the transverse plane 59.

Figure 8:
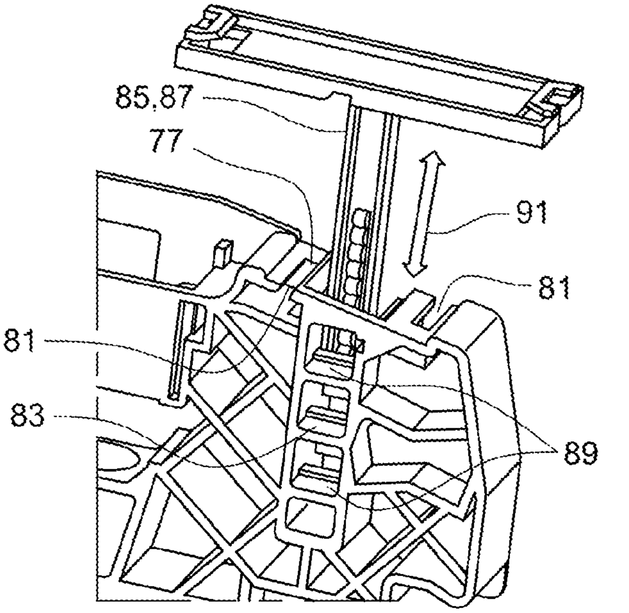
FIG. 8 is a perspective view of the receptacle device with a sliding tunnel.
Figure 9:
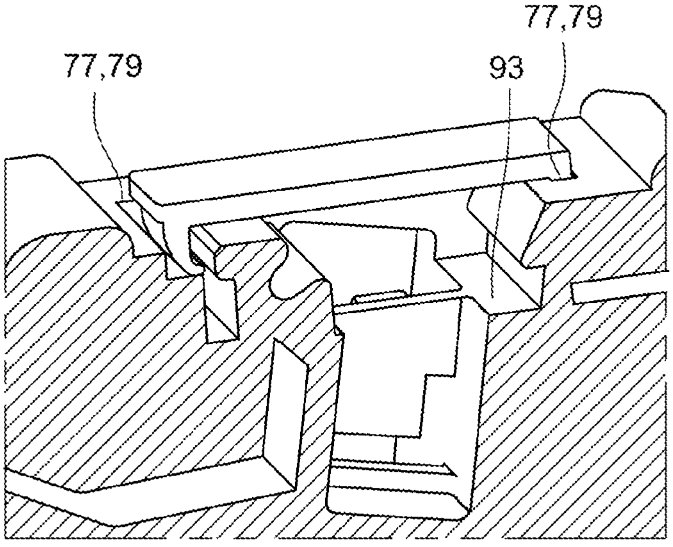
FIG. 9 is a sectional perspective view of the receptacle device with lateral blocking arrangements.

According to a variant illustrated in FIGS. 8 and 9, at least one cooperating assembly 15, 21, 27 present a corresponding lateral blocking arrangement 77. The lateral blocking arrangement 77 has two lateral abutments 79, each configured for blocking laterally a corresponding protrusion 17, 23, 29.

Both lateral abutments 79 are diagonally opposed with regard to the longitudinal dimension 53. In other words, the two lateral abutments 79 are located on opposed longitudinal sides of the area 51. This enables blocking the corresponding cooperating assembly 15, 21, 27 according to the lateral dimension.

Each lateral blocking arrangement 77 has two lateral through holes 81, as shown in FIG. 8, each being configured for the lateral passage of a corresponding protrusion 17, 23, 29 of a cooperating assembly 15, 21, 27. Both lateral through holes 81 are diagonally opposed with regard to the longitudinal dimension 53. Each lateral abutment 79 is in front of a corresponding lateral through hole 81.

As shown in FIG. 8, the receptacle device 1 further comprises a sliding tunnel 83 configured for cooperating with a pin 85 of a sliding marker or marker holder 87, the sliding tunnel 83 being provided with indexing elements 89 arranged for maintaining the pin 85 in a plurality of more or less inserted positions according to an extension direction 91 of the sliding tunnel 83.

The extension direction 91 of the sliding tunnel 83 is transverse to the longitudinal plane 41. The sliding tunnel 83 is formed in a bottom surface 93 of the central recess 45. Thus, the sliding tunnel 83 is geometrically distinct from the cooperating assemblies.

Each indexing element 89 is located on both sides of the transverse plane 59 without facing each other. This staggered construction enables easily realizing the receptacle device 1 by molding.

In view of the above, the design of the receptacle device 1 allows plugging three different types of accessories 3, 7, 11 according to similar orientations. In addition, the protrusions of the first type 17 and the protrusions of the second type 23 extend according to different directions that respectively cooperate with corresponding cooperating elements 5, 9 extending outwards and inwards.

The common recess 33 enables simplifying the geometry of the receptacle device 1 as its spatial configuration engenders two protrusions 17*a*, 23*a*. The common recess 33 also serves as marker that helps a user to correctly position the first accessory 3 or the second accessory 7 with respect to the receptacle device 1.

The distance between the two protrusions of the first type 17 and the distance between the two protrusions of the second type 23 are different. This enables having accessories of different length to be installed on the same receptacle device 1.

The fact that the access recess 49 is located on the side of the longitudinal dimension 53 facilitates the dismounting of the any accessory 3, 7, 11 as a user is able to push said accessory in alignment to the profiles and also transversally from under said accessory 3, 7, 11.

The receptacle device 1 therefore includes several mounting advantages in a reduced space. In this way, it can easily be formed within a face 75 of a terminal block 73.

The invention is not limited to the embodiments described above by way of example, but rather encompasses all the variants.

What is claimed is:

1. A receptacle device, comprising:

a first cooperating assembly configured to receive a first accessory having a plurality of first sized cooperating elements, the first cooperating assembly has a pair of protrusions of a first type that have inward facing edges symmetrical with regard to a first central plane and that extend toward each other transversally to the first central plane and outward facing edges asymmetrical with regard to the first central plane; and a second cooperating assembly configured to receive a second accessory having a plurality of second sized cooperating elements, the second cooperating assembly has a pair of protrusions of a second type that have inward facing edges symmetrical with regard to a second central plane and that extend opposite to each other transversally to the second central plane and outward facing edges asymmetrical with regard to the second central plane, the first central plane being parallel to and displaced transversally from the second central plane.

2. The receptacle device of claim 1, wherein the protrusions of the first type include a first protrusion of the first type and the protrusions of the second type include a first protrusion of the second type, the receptacle device has a common recess where the first protrusion of the first type and the first protrusion of the second type extend towards each other transversally to the first central plane.

3. The receptacle device of claim 2, wherein the protrusions of the first type include a second protrusion of the first type and the protrusions of the second type include a second protrusion of the second type, the receptacle device has a recess of a first type where the second protrusion of the first type is formed and has a recess of a second type where the second protrusion of the second type is formed.

4. The receptacle device of claim 1, wherein the protrusions of the first type and the protrusions of the second type extend along a longitudinal plane transverse to the first central plane.

5. The receptacle device of claim 1, wherein the first cooperating assembly and/or the second cooperating assembly have a supporting surface extending transverse to the first central plane and in contact with the first accessory or the second accessory in a mounted position.

6. The receptacle device of claim 5, wherein the receptacle device has an access recess extending transversally to and deeper than the supporting surface, the access recess at least partially faces the first accessory or the second accessory in the mounted position transversally to the supporting surface.

7. The receptacle device of claim 6, wherein the protrusions of the first type and the protrusions of the second type extend in an area transversally to the first central plane.

8. The receptacle device of claim 7, wherein the area is defined by a longitudinal dimension and a lateral dimension, the access recess extending at least partly outside the lateral dimension.

9. The receptacle device of claim 8, wherein the first cooperating assembly and/or the second cooperating assembly have a corresponding lateral blocking arrangement with a pair of lateral abutments.

10. The receptacle device of claim 9, wherein the lateral abutments each laterally block a corresponding protrusion of the pair of protrusions of the first type and/or the second type, the lateral abutments are diagonally opposed with regard to the longitudinal dimension.

11. The receptacle device of claim 8, wherein the protrusions of the first type and the protrusions of the second type each have a profile extending according to the lateral dimension.

12. The receptacle device of claim 6, wherein the access recess is one of a pair of symmetrical access recesses with respect to a transverse plane extending transversally to the first central plane.

13. The receptacle device of claim 12, further comprising a pair of symmetrical parts with respect to the transverse plane, the symmetrical parts are attached to each other.

14. The receptacle device of claim 1, further comprising a third cooperating assembly receiving a third accessory in a mounted position alternatively to the first accessory or the second accessory, the third accessory has a plurality of third sized cooperating elements.

15. The receptacle device of claim 14, wherein the third cooperating assembly has a pair of protrusions of a third type that are symmetrical with regard to a third central plane and that extend toward each other transversally to the third central plane, the third central plane is parallel to the first central plane.

16. The receptacle device of claim 1, wherein each of the protrusions of the first type and/or the second type forms a retaining wall cooperating with a leg of the first accessory and/or the second accessory.

17. The receptacle device of claim 16, wherein the leg extends in an opposite direction from the one of the protrusions with which the leg cooperates and extends transversally to the first central plane.

18. A terminal block, comprising:

a receptacle device according to claim 1 built in a face of the terminal block and not exceeding the face transversally to the face.

19. A receptacle device, comprising:

a first cooperating assembly configured to receive a first accessory having a plurality of first sized cooperating elements, the first cooperating assembly has a pair of protrusions of a first type that are symmetrical with regard to a first central plane and that extend toward each other transversally to the first central plane; and a second cooperating assembly configured to receive a second accessory having a plurality of second sized cooperating elements, the second cooperating assembly has a pair of protrusions of a second type that are symmetrical with regard to a second central plane and that extend opposite to each other transversally to the second central plane, the first central plane is parallel to the second central plane, the receptacle device further comprising a sliding tunnel cooperating with a pin of a sliding marker or a marker holder, the sliding tunnel has a plurality of indexing elements maintaining the pin in a plurality of positions along an extension direction of the sliding tunnel.

20. An accessory cooperation system, comprising:

a first accessory having a plurality of first sized cooperating elements;

a second accessory having a plurality of second sized cooperating elements; and a receptacle device alternatively receiving the first accessory or the second accessory in a mounted position, the receptacle device has a first cooperating assembly configured to receive the first accessory and a second cooperating assembly configured to receive the second accessory, the first cooperating assembly has a pair of protrusions of a first type that are symmetrical on an inward facing side with regard to a first central plane and that extend toward each other transversally to the first central plane, and asymmetrical on an outward facing side, the second cooperating assembly has a pair of protrusions of a second type that are symmetrical on an outward facing side with regard to a second central plane and that extend opposite to each other transversally to the second central plane and asymmetrical on an inward facing side, the first central plane being parallel to and displaced transversally from the second central plane.

* * * * *